United States Patent [19]
Stahl

[11] Patent Number: 5,149,388
[45] Date of Patent: Sep. 22, 1992

[54] PRE-SEWN LETTER AND METHOD

[76] Inventor: Ted Stahl, 41612 Clairpointe, Mt. Clemens, Mich. 48043

[21] Appl. No.: 651,018

[22] Filed: Feb. 4, 1991

Related U.S. Application Data

[63] Continuation of Ser. No. 459,727, filed as PCT/US88/03700, Oct. 2, 1988.
[51] Int. Cl.⁵ .............................................. B32B 31/00
[52] U.S. Cl. .................................. 156/250; 156/256; 156/258; 112/439; 112/266.1; 206/45.33; 428/102; 428/104; 428/187; 428/197; 428/906.6
[58] Field of Search ............ 156/250, 256, 258; 428/40, 102, 104, 197, 158, 187, 906.6; 112/439, 266.1; 206/45.33

[56] References Cited
U.S. PATENT DOCUMENTS

| | | | |
|---|---|---|---|
| 3,657,060 | 4/1972 | Haigh | 428/175 |
| 3,662,878 | 5/1972 | Conrad | 206/45.333 |
| 4,517,910 | 5/1985 | Jalowsky | 112/439 |
| 4,981,742 | 1/1991 | Haigh | 428/81 |

*Primary Examiner*—William A. Powell
*Assistant Examiner*—Merrick Dixon
*Attorney, Agent, or Firm*—Brooks & Kushman

[57] ABSTRACT

An improved method for producing a multi-colored emblem which may be bonded to a fabric is disclosed which provides an emblem with an embroidered appearance. The emblem is easily heat sealable onto difficult to adhere fabrics. The method generally involves providing a first woven material blank, providing a barrier layer of thermoplastic material, laminating the barrier layer onto one side of said material blank to form an assembly, cutting said assembly to a specific configuration, sewing a thread about the periphery of the cut assembly, and laminating said assembly onto a second woven material blank having a different color. This second assembly is again cut to a complimentary larger configuration and also provided with a thread about the periphery. The two material blanks are then heat sealed together and an adhesive layer is provided to the exposed barrier layer.

8 Claims, 2 Drawing Sheets

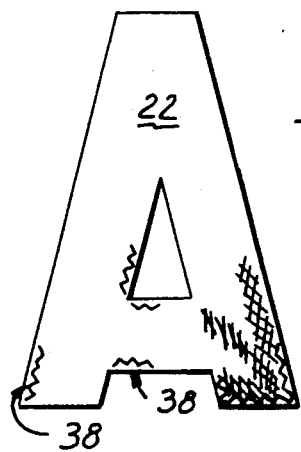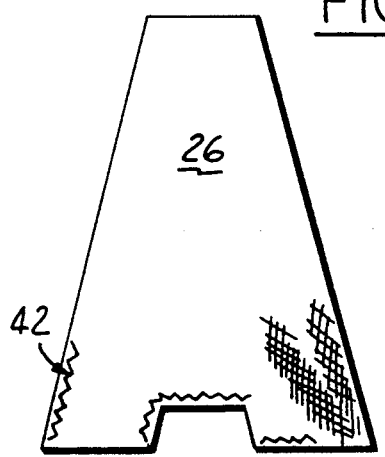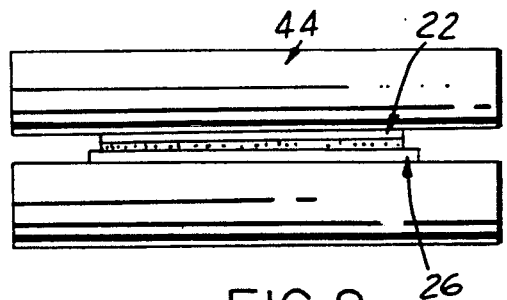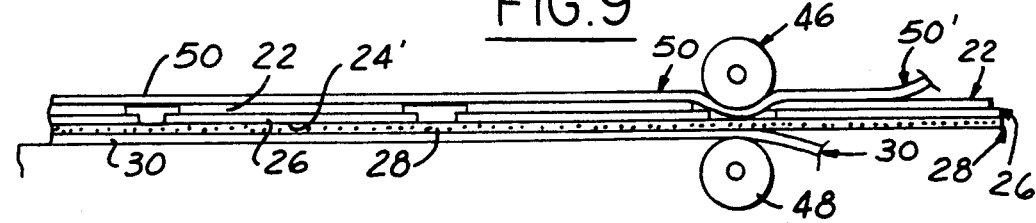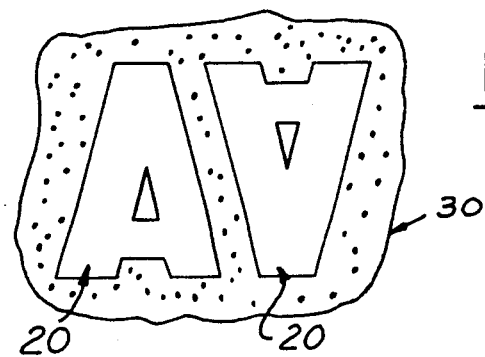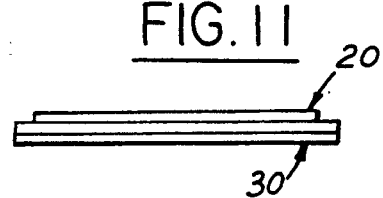

PRE-SEWN LETTER AND METHOD

This is a continuation of co-pending application Ser. No. 07/459,727, filed as PCT/US88/03700, Oct. 2, 1988.

FIELD OF INVENTION

The present invention relates to an improved method for producing a multi-colored emblem having the appearance of being sewn on a garment which is easily heat-sealable to another fabric and more particularly the emblem is readily fastenable to difficult to adhere to fabrics such as siliconized nylon, Gortex, polypropylene, tri-acetate, and Lyrca.

BACKGROUND ART

Emblems such as letters and numbers having embroidered edges have been popular for use on sporting uniforms and jackets for many years. Often the embroidery is the only way in which the letters and/or numbers can be secured to garments made from hard to adhere to materials such as siliconized nylon, Gortex, polypropylene, tri-acetate and Lycra. The nature of these fabrics make it very difficult for any adhesive to penetrate the fabric and form a good bond between the letters or numbers and the garment.

Heat sealing has allowed prestitched letters and numbers, giving an embroidered appearance, to be bonded to garments made from easy to adhere to fabrics such as twill, cotton, fleece, and silk. U.S. Pat. No. 3,816,211 discloses a method for making an embroidered emblem which has a fabric base with an embroidered design on the base and a thermoplastic material laminated to the base. The emblem is fastenable to a garment by conventional heat sealing. The emblem is not heat sealable onto difficult to adhere to fabrics.

U.S. Pat. No. 4,517,910 discloses an embroidered design for securement to an article in which the design is embroidered on a substrate made of woven polyester fabric. The substrate is bonded to a low-melt thermoplastic adhesive film to form a lamination. The design is traced along its outer and inner peripheries to remove all portions of the lamination, except the design consisting of the embroidering thread and the plastic film. The design is then heat sealed to a garment to simulate a design embroidered directly on the garment.

DISCLOSURE OF INVENTION

An object of the present invention is to provide a method for providing a multi-colored emblem having an edge stitched or embroidered appearance which is easily heat sealable onto difficult to adhere to fabrics and/or garments and eliminate the sewing and thereby the expense associated with securing an embroidered emblem to a difficult to adhere to fabric.

In carrying out the above object and other objects of the invention, the method for producing an emblem in accordance with the invention comprises the steps of providing a first woven material blank, providing a barrier layer of a thermoplastic material and laminating with the application of heat and pressure the barrier layer onto one side of the material blank. The material blank with barrier layer thereon is cut to the configuration of the emblem to be produced and is then sewn about the periphery of the cut material blank to produce an embroidered appearance. A second woven material blank of a color contrasting with that of the first blank and provided with a similar barrier layer is cut to a complimentary but larger configuration than the first blank and then sewn about the periphery to produce an embroidered appearance. The two material blanks are heat sealed together leaving the barrier layer of the second blank material exposed. Then an adhesive layer of an uncured linear saturated polyester in combination with a heat activated curing agent having a paper carrier is applied to the exposed barrier layer.

The adhesive layer has a lower melting temperature than the barrier layer whereby the adhesive layer is unable to pass through the barrier layer. The adhesive layer, which has the capability of penetrating the interstices of a fabric against which it is adhered, will discolor or deface the emblem if applied directly thereto. Thus, the barrier layer allows the embroidered appearing emblem to be conventionally heat sealed to difficult to adhere to materials such as siliconized nylon, Gortex, polypropylene, tri-acetate and Lycra and when adhered looks as if the emblem has been sewn onto the material.

In the preferred embodiment of the invention the woven material blank consists of twill, polyester, cotton, or felt. Suitable barrier layers consist of PVC, AVA, urethane, polyester, or nylon. The barrier layer has a higher melting point than the adhesive layer and prevents the adhesive layer from entering the emblem.

The above object and other objects, features and advantages of the present invention are readily apparent from the following detailed description of the best mode for carrying out the invention when taken in connection with the accompanying drawings.

BRIEF DESCRIPTION OF THE DRAWINGS

FIG. 5 is a front view of the cut first material blank and barrier layer subsequently having embroidered stitching sewn about the peripheral edges;

FIG. 6 is a side view of the cutting die shown in FIG. 4 positioned for cutting a second material blank and barrier layer;

FIG. 7 is a front view of the cut second material blank and barrier layer subsequently having embroidered stitching sewn about its peripheral edges;

FIG. 8 is a side view of the second material blank being heat sealed onto the first material blank to form a two-color emblem;

FIG. 9 is a side view of an adhesive layer with paper carrier being applied to the laminated together first and second material blanks with the aid of pressure applied by heated rollers;

FIG. 10 is a broken out front view of two emblems on the paper carrier after exiting the heated rollers; and FIG. 11 is a side view of the emblem having had the paper carrier trimmed about the periphery of the emblem.

BEST MODE FOR CARRYING OUT THE INVENTION

Figure 1:
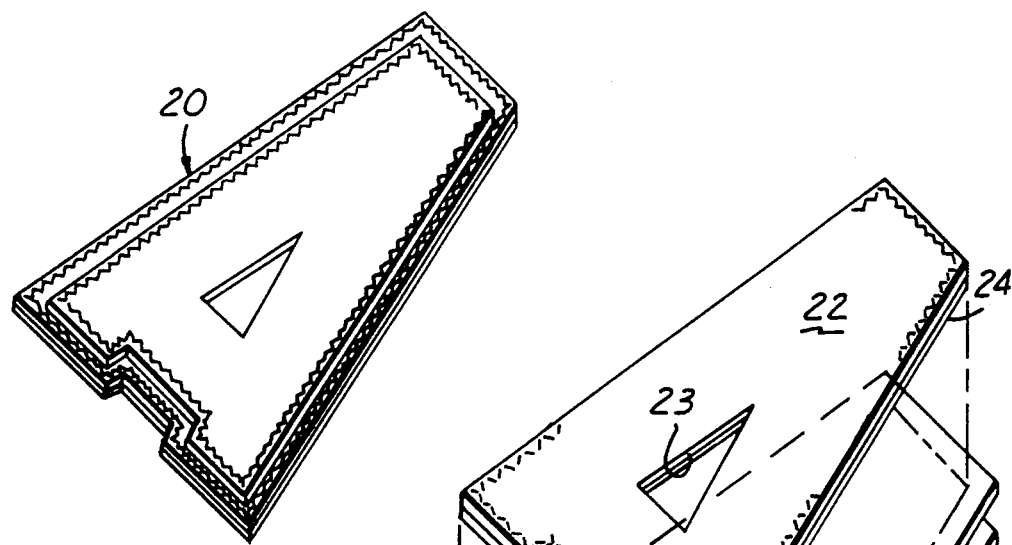
FIG. 1 is a perspective view of an embroidered emblem produced according to the present invention.

Referring to FIG. 1 of the drawings, there is shown a laminated embroidered emblem produced in accordance with the present invention, consisting of the letter A and generally indicated by reference number 20. As is hereinafter more fully described, the embroidered emblem 20 eliminates sewing of letters and logos onto hard to adhere to fabrics and/or garments such as siliconized nylon, Gortex, polypropylene, tri-acetate and Lycra while providing the appearance of being sewn on. The embroidered emblem 20 can also consist of a number of colored layers that all look as if the layers have been embroidered together.

Figure 2:
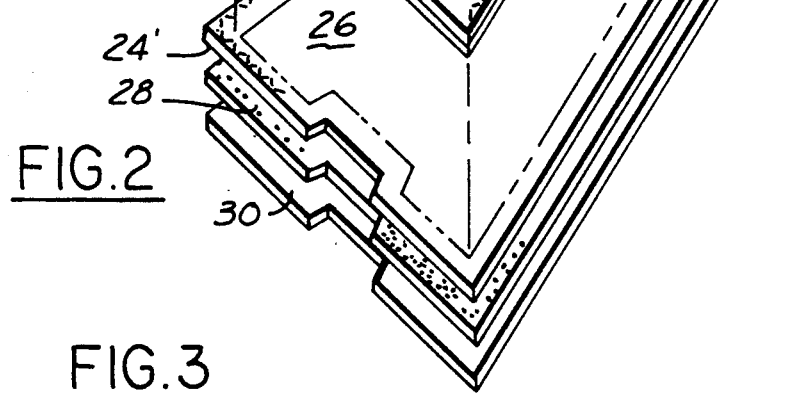
FIG. 2 is an exploded perspective view of the embroidered emblem shown in FIG. 1.

As shown in FIG. 2, the embroidered emblem 20 shown in FIG. 1 includes a first woven material blank 22, a layer 24 of a thermoplastic material such as PVC, AVA, urethane, polyester or nylon, a second woven material blank 26 larger than the first blank 22 and of a contrasting color, another layer 24', similar to layer 24, an adhesive layer 28 and a paper carrier 30. As seen in FIGS. 1 and 2, the woven blanks 22 and 26 are complementary shapes yet of different relative sizes thereby providing a two color effect emblem with a background color and foreground color combination. Opening 23 in blank 22 need not be present in blank 26 to heighten the contrast between the blanks, or may be present but simply smaller than opening 23 so that the uniform or other material upon which the finished letter is placed will be visible through the opening.

Figure 3:
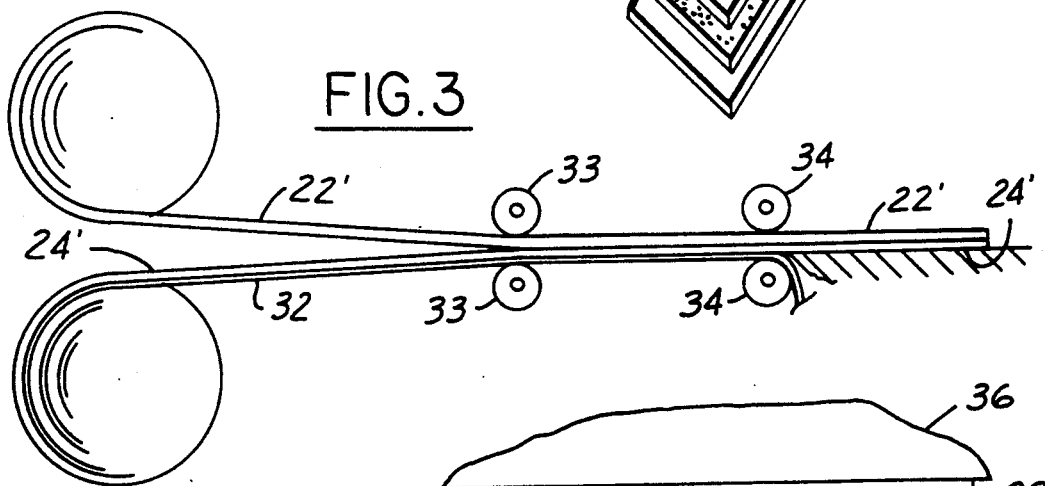
FIG. 3 is a side view of a barrier layer being applied to a first material blank.
Figure 4:
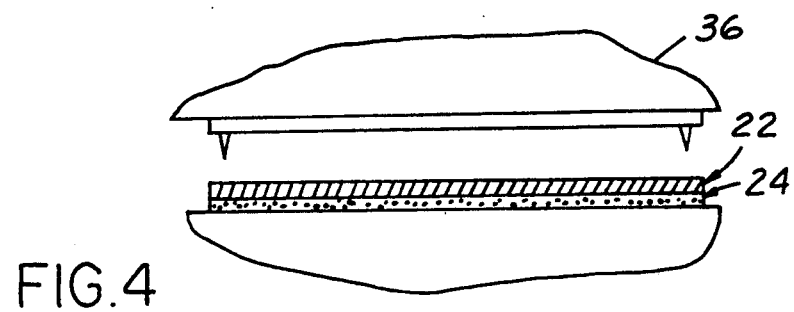
FIG. 4 is a side view of a cutting die positioned for cutting the first material blank and barrier layer.

Manufacture of the blank 22 is shown in FIGS. 3 and 4 of the drawings, wherein the material 22, is laminated on one side with a barrier layer 24' of a thermoplastic material having a paper carrier 32 thereon. The paper carrier 32 is peeled off the barrier layer 24' as the material blank and barrier layer are passed between pairs of heated rollers 33 and 34 which effect the lamination. The barrier layer has a melting point generally in the range of 280° to 350° F. The material 22' with barrier layer 24' attached is then cut to the configuration of a letter such as A or any other symbol in a die 36 shown in FIG. 4.

After the step of cutting, the letter blank is sewn, as illustrated in FIG. 5, with a thread 38 about its peripheral edges to produce an embroidered appearance.

In FIG. 6 a second material blank 26, of a different color and larger than the first material blank 22 is formed according to the same procedure as in FIG. 3 and is then die cut as at 40 to the corresponding shape (but without hole 23) of the letter A of the first material blank 22. The second material blank 26 provides a background color to the letter A cut from the first material blank. The second material blank 26 is then stitched around its peripheral edges with a thread 42 as shown in FIG. 7 to produce an embroidered appearance.

FIG. 8 illustrates the lamination of the letter blanks 22 and 26. The two blanks are laminated together between the platen of a heat sealing machine by conventional heat sealing techniques wherein adhesive layer 24 between the letters is melted in the range of between 280° and 350° F. and pressure is applied to cause both blanks to stick together The temperature and pressure selected is such as to insure that the adhesive layer 24 on the blank 22 clings to the fibers of the blank 26 to lock the blanks together and give the appearance that the stitching 36 extends through the blank 26. For this purpose the upper platen 44 is only heated while the lower platen remains relatively cooler so as not to melt the adhesive layer 24'. This later layer becomes a barrier layer as hereinafter explained.

In FIG. 9 of the drawings the adhesive layer 28 being an uncured linear saturated polyester in combination with a heat activated curing agent, having a paper carrier 30, is secured to the exposed adhesive layer 24' of the blank 26. The adhesive layer 28 is applied by positioning the superimposed blanks 22 and 26 with their adhesive layer 24' against the adhesive 28 on the paper carrier 30 and then passing the combination between lightly heated rollers 46 and 48 that apply only enough heat and pressure to adhere the laminations together. A sheet of blotting paper 50 is placed to overlie the assembly and pass beneath upper roller 46 and serves to absorb the adhesive layer 28 surrounding the letter blanks. Thus, the assembly being laminated is sandwiched between the paper carrier 30 and the blotting paper 50, with the blotting paper being stripped therefrom as at 50'.

The adhesive layer 28 has a melting point lower than that of adhesive 24', generally of about 250° F. or less. It is of a character specified in copending application of John Mahn, entitled "Ornamental Transfer Specially Adapted for Adherence to Nylon", which is incorporated herein by reference.

The adhesive layer 28 is a thermosettable film of a linear saturated polyester polymer which includes a heat activated curing agent. The uncured polyester itself is a linear alkyl unsaturated polyester formed by reacting a glycol with a diacid. The molecular weight of the uncured polyester polymer must be low enough to flow and wet the surface of the nylon at application temperature, i.e., generally about less than 450° F. Preferably it should be from about 5 to 30,000 and most preferably about 10 to 15,000. The polyester adhesive should include a heat activated curing agent.

Specifically suitable diols include ethylene glycol, propylene glycol, 1,3-propane diol, 1,4-butane diol, 1,5-pentane diol, 1,6-hexane diol, 1,8-octane diol, 1,4-cyclohexanedimethanol, 1,3-cyclohexanedimethanol, diethyleneglycol and the like.

Useful diacids for making these polyesters would include aromatic dicarboxylic acids having no vinyl saturation such as isophthalic acid or anhydride, phthalic acid or anhydride, terphthalic acid or anhydride or aliphatic dicarboxylic acids such as adipic acid, succinic acid, gluteric acid and the like.

The heat activated curing agent must act to cure the polyester upon heating. It should be a heat activated curing agent since these ornamentals must have a shelf life of several months. The heat activated curing agent can be an isocyanate curing agent preferably a blocked isocyanate curing agent. Suitable such curing agents include phenol blocked methylene bis-4-phenylisocyante such as those disclosed in U.S. Pat. No. 3,307,966 and phenolaldehyde blocked polyisocyanates such as those discussed in U.S. Pat. No. 3,226,276. Other blocked isocyanates include dimerized toluene diisocyanates and methylethyl-ketoxime blocked polyisocyanates. Methods of forming such polyesters are well known and are disclosed in U.S. Pat. Nos. 4,350,807, 3,898,358, 4,606,785 and 4,215,516.

A preferred adhesive for use in the present invention is Bostick adhesive 10-300-3 which is a thermosetting linear saturated polyester adhesive using an isocyanate curing agent and a polyester formed from ethylene glycol and methylterphthalic acid. This is dissolved in methylethyl ketone and methylene chloride and this has a weight average molecular weight of 10–15,000. The polyester adhesive layer 28 is formed by dissolving the polyester in a solvent and then coating it onto the release layer 30 and drying it at from about 250° to 325° F. (121°–163° C.). The thus formed layer or film may then be laminated to the barrier layer 24' with slight heat and pressure, the temperature being such as to not initiate the cross-linking of the adhesive layer 30.

This adhesive will allow the emblem 20 to be applied to a difficult-to-stick-to fabric such as nylon, by conventional heat sealing techniques. At the same time the emblem 20 is being applied to such a fabric, the higher melting temperature of the barrier layer acts as a physical and thermal barrier and prevents the adhesive layer 28 from entering the fabric of the emblem which would thereby discolor, deface, or cause the emblem to sponge up the adhesive.

The emblems 20 (shown in FIG. 10) may be supported and stored for ease of handling on a strip formed by the paper carrier 30. The emblems 20 are trimmed about the periphery as seen in FIG. 11 prior to application of the emblem on a garment.

While the best mode for carrying out the invention has been described in detail, those familiar with the art to which this invention relates will recognize various alternative designs and embodiments for practicing the invention as defined by the following claims.

What is claimed is:

1. A method of producing an embroidered emblem for application by heat to a fabric comprising the steps of:
   providing a woven fabric layer;
   cutting from the woven fabric layer the shape of the emblem to be formed;
   sewing a thread about the periphery of the cut-out emblem to form an embroidered emblem; and
   applying a thermoplastic adhesive over one surface of the emblem and the sewn thread exposed on such surface.

2. The method of claim 9 wherein prior to cutting the shape of the emblem from the woven fabric layer, applying a barrier layer to the woven fabric layer, and applying said adhesive over such barrier layer.

3. The method of claim 2 wherein the barrier layer is a thermoplastic resin.

4. The method of claim 3 wherein the barrier layer is selected from the group consisting of PVC, AVA, urethane, polyester and nylon.

5. The method of claims 2, 3 or 4 wherein the melting point of the adhesive is lower than the melting point of the barrier layer.

6. The method of claim 5 wherein the thermoplastic adhesive is a thermosettable film of a polyester polymer and a heat-activated curing agent.

7. The method of claim 1 which further comprises the step of applying a barrier layer to the woven fabric layer prior to the application of the thermoplastic adhesive.

8. A method of producing an embroidered emblem for application by heat to a fabric comprising the steps of:
   applying a thermoplastic barrier layer to the woven fabric layer;
   cutting from the woven fabric layer and attached barrier layer the shape of the emblem to be formed;
   sewing a thread about the periphery of the cut out emblem to form an embroidered emblem; and
   applying a thermoplastic adhesive over one surface of the emblem and the sewn thread exposed on such surface, wherein the thermoplastic adhesive has a melting point lower than the melting point of the barrier layer.

* * * * *

UNITED STATES PATENT AND TRADEMARK OFFICE
CERTIFICATE OF CORRECTION

PATENT NO. : 5,149,388
DATED : September 22, 1992
INVENTOR(S) : Ted Stahl

It is certified that error appears in the above-identified patent and that said Letters Patent is hereby corrected as shown below:

Column 6, line 1, "9" should read -- 1 --.

Column 6, line 23, insert -- providing a woven fabric layer; --.

Signed and Sealed this

Twenty-eighth Day of September, 1993

Attest:

BRUCE LEHMAN

Attesting Officer     Commissioner of Patents and Trademarks